United States Patent [19]

Fitzpatrick et al.

[11] Patent Number: 5,423,043
[45] Date of Patent: Jun. 6, 1995

[54] METHOD AND APPARATUS FOR CREATING AND MONITORING LOGICAL ASSOCIATIONS AMONG DESKTOP OBJECTS

[75] Inventors: Gregory P. Fitzpatrick, Keller; Marvin L. Williams, Lewisville, both of Tex.

[73] Assignee: International Business Machines Corporation, Armonk, N.Y.

[21] Appl. No.: 184,420

[22] Filed: Jan. 21, 1994

[51] Int. Cl.6 .............................................. G06F 13/00
[52] U.S. Cl. ............................ 395/700; 364/DIG. 1; 364/286; 395/155
[58] Field of Search ................ 395/500, 700, 157, 159, 395/600, 155

[56] References Cited

U.S. PATENT DOCUMENTS

| | | | |
|---|---|---|---|
| 5,202,828 | 4/1993 | Vertelney et al. | 395/159 |
| 5,241,645 | 8/1993 | Cimral et al. | 395/600 |
| 5,247,651 | 9/1993 | Clarisse | 364/DIG. 1 |
| 5,287,447 | 2/1994 | Miller et al. | 395/157 |
| 5,297,249 | 3/1994 | Bernstein et al. | 395/157 |

Primary Examiner—Thomas M. Heckler
Attorney, Agent, or Firm—D. A. Mims

[57] ABSTRACT

A method and apparatus to associate actions, attributes, objects or devices on a computer desktop to reduce multiple manual processes. A media association agent monitors, builds, maintains and recalls links based on prior actions and user choices. The media association agent exists within a data processing system as a background process which may be implemented as a terminate-and-stay-resident (TSR) process. Devices, attributes, objects and actions are registered by the media association agent and stored in non-volatile storage. Associations are then built by links among the entities registered with the media association agent. These links take the form of entries in relational database tables, entries in flat files, linked lists, sets of pointers, etc. The groups of links are assigned unique identifiers for internal use by the media association agent. The media association agent acts continuously to record actions and build links passively or on demand based on user specific user signals such as a trigger.

13 Claims, 5 Drawing Sheets

METHOD AND APPARATUS FOR CREATING AND MONITORING LOGICAL ASSOCIATIONS AMONG DESKTOP OBJECTS

FIELD OF THE INVENTION

This invention relates to a data processing system, and more particularly, to the creation and management of associations or links among an arbitrary number of devices, objects, attributes or actions.

BACKGROUND OF THE INVENTION

The office environment has witnessed a quiet technological revolution. Personal Computers (PCs), facsimile (fax) machines, voice mail, electronic mail (e-mail), conferencing, desktop publishing and other tools have changed the workplace forever. As data and devices proliferate, tasks like organizing information, locating files, and securing enough disk space gets increasingly difficult. Users performing routine office tasks are forced to search for data objects and information associated with a given action. This often requires users to employ searching and lookup techniques, including object keywords and indexing/sorting tools. As a result of the technological revolution, connection ease and speed, bandwidth capacity, ubiquity and reliability have become new user needs.

Users within the office environment frequently need to place telephone calls while simultaneously referencing documents stored in multiple directories on the desktop. While the availability of folder objects aid in the organization of documents on the desktop, the user must still create the folder objects, update, and remember the names of the folder objects on the desktop. An example will illustrate the problems faced by users in current office environments. Imagine a user has received an electronic facsimile distribution into a Local Area Network (LAN) server, but the document has not yet been sent to the receiving fax device. The user receives the fax into an in-basket, decides to print the document, and files the document into an electronic folder. There is currently no way to associate a sequence of actions (e.g., receiving, filing, printing) with the document. Furthermore, there is no way to associate the sequence of actions with a document category such that future documents may be treated in the same manner.

Various desktop management techniques have evolved in the form of software agents to address the association of actions with objects. These software agents may be used to filter information and prioritize messages, create and distribute business forms, and make videos of screen activities for training and presentations. These software agents attempt to replicate the actions of people doing information delivery tasks. The software agents, acting on behalf of the user, execute application workflows and interact with computer applications and phone and fax resources to perform transactions typically requiring human intervention. One problem is that most software agents address only one function. Another problem is that software agents are add-ons and are not integral components. Still another problem is that setup of these agents is complex and confusing, often requiring a user to ascertain interrupts and memory addresses used by the software and hardware components. In addition, the techniques suffer from the unavailability of software with the capability to automatically report hardware and software addresses, interrupts and parameters settings; identify which parameters are set incorrectly; and produce configuration and system files.

Still other desktop management techniques have employed the concepts of user control linking (e.g., Object Linking & Embedding (OLE), Dynamic Data Exchange (DDE)). These techniques allow the user to pass data represented by a control to other applications that are invoked via a linking program controlling linking, to integrate at execution time applications that are totally unaware of each other. The techniques permit the user to connect a person's name, department, and location to an address-book window containing information about the person. User control linking, however, is incapable of establishing links with media devices, user application actions, or attributes.

Consequently, a technique is needed that provides a procedure for managing the creation and monitoring of an arbitrary number of devices, objects, attributes or actions on a computer's desktop.

SUMMARY OF THE INVENTION

This invention provides a method and apparatus to associate actions, attributes, objects or devices on a computer desktop to reduce multiple manual processes. A media association agent is provided to monitor, build, maintain and recall links based on prior actions and user choices. The media association agent exists within a data processing system as a background or windowed activity, and implemented in one embodiment as a terminate-and-stay-resident -(TSR) process. Devices, attributes, objects and actions are registered by the media association agent and stored in non-volatile storage. Associations are then built by links among the entities registered with the media association agent. These links take the form of entries in relational database tables, entries in flat files, linked lists, sets of pointers, etc. The groups of links are assigned unique identifiers for internal use by the media association agent. The media association agent may act continuously to record actions and build links passively or on demand based on user specific user signals such as a trigger.

DETAILED DESCRIPTION

Figure 1:
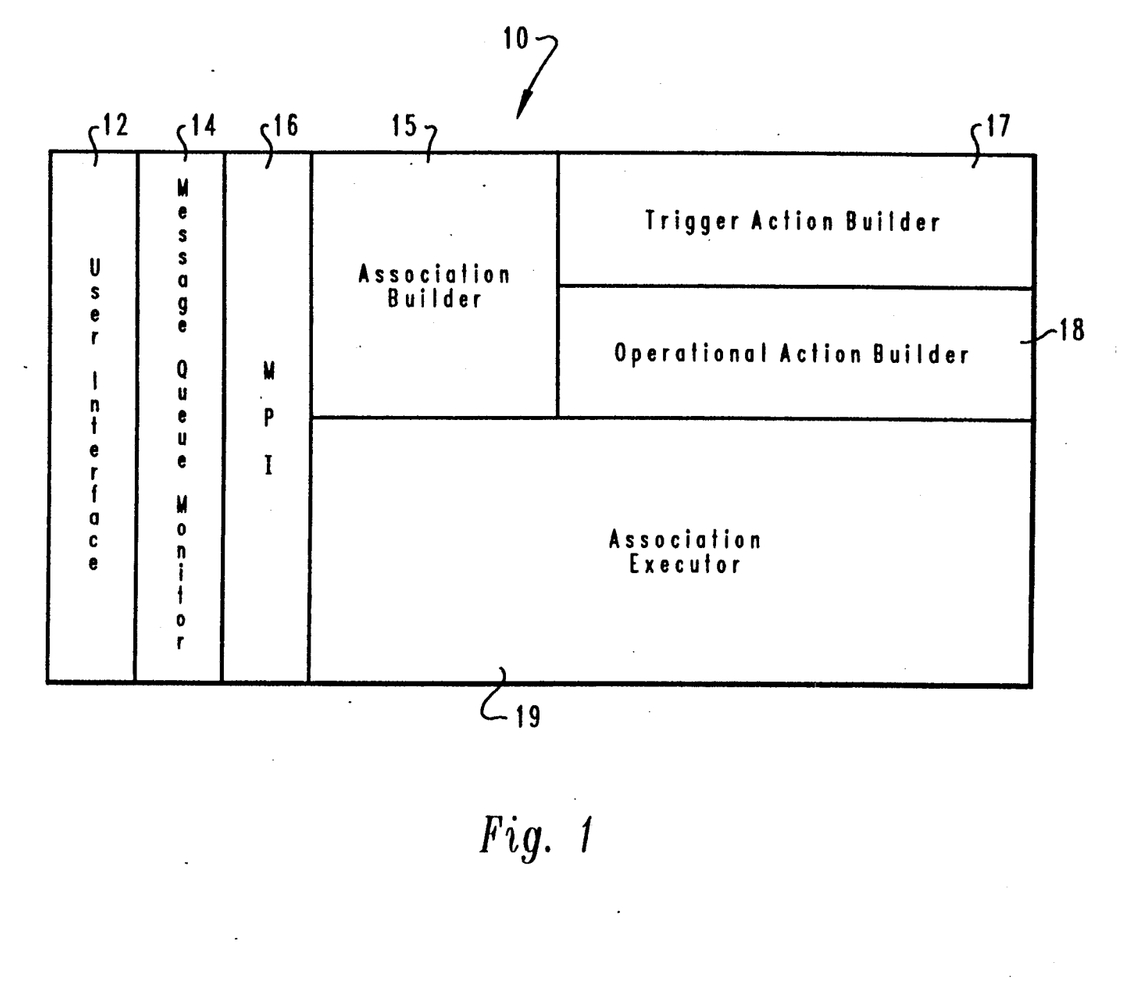
FIG. 1 depicts a block diagram of a Media Association Agent.

With reference to the figures, and in particular FIG. 1, a block diagram showing the basic components of a Media Association Agent (MAA) 10 is shown. The MAA 10 is an electronic agent which monitors, builds, maintains and recalls links among attributes, devices, objects and actions. For the purpose of this invention, attributes are flags that store information about one or more entities. Devices are mechanical, electrical, or electronic contrivances with a specific purpose such as telephones, voice recognition cards, etc. One skilled in the art will recognize that the invention also encompasses virtual devices such as parallel ports (LPT1) or serial ports (COM1). Objects are representations of entities of which there, are four types. Program objects represent software applications such as word processors, spreadsheets, and database managers. Folder objects contain other objects, including other folders. Folders are similar to a directory in Disk Operating System (DOS) programs. Data-file objects include information such as text, videos, and sound. Device objects encompass printers, faxes, modems, and drives on the user's computer desktop. Actions are activities or processing activities steps, operations, etc. A single or sequence of actions such as receiving, filing and printing an object is the type of operation monitored by the MAA 10. One skilled in the art recognizes that the MAA 10 creates/maintains a table of actions. The user, for example, may via prompts indicate which events are deemed triggering events and which are operational actions. Each table entry (record) may contain a field like "ACTION TYPE" whose value may be "trigger" or "operation". When used in this invention, an operation is an action committed as the result of a trigger. A trigger, in contrast, is an action potentially resulting in the commission of other actions.

With reference again to FIG. 1, the MAA 10 contains a Media Programming Interface (MPI) 16 which interfaces with the attributes, devices, objects and actions to permit monitoring different routine office tasks. The MAA 10 also contains an association builder 15 which builds associations among the various entities. The association builder 15 provides the user with the capability for building associations between, for example, a telephone, the number dialed, the caller, the callee, the document repository and a document set. The MAA 10 contains a user interface 12 which permits the user to observe and modify operations within the MAA 10. The message queue monitor (MQM) 14 oversees message interchange when office tasks are executed. The association executor 19 executes the MAA 10 associations created by the association builder 15. The trigger action builder 17 and operational action builder 18 allow a user to specify which actions are to be interpreted as triggers or operations associated with a given trigger or triggers. For example, a user is permitted to identify triggering events such as the dialing of a particular telephone to initiate monitoring by the MAA 10. A user is also provided the capability to specify operational actions so that the MAA 10 can differentiate between actions that may be executed (e.g., operations) or actions to be used as a trigger event.

Figure 2:
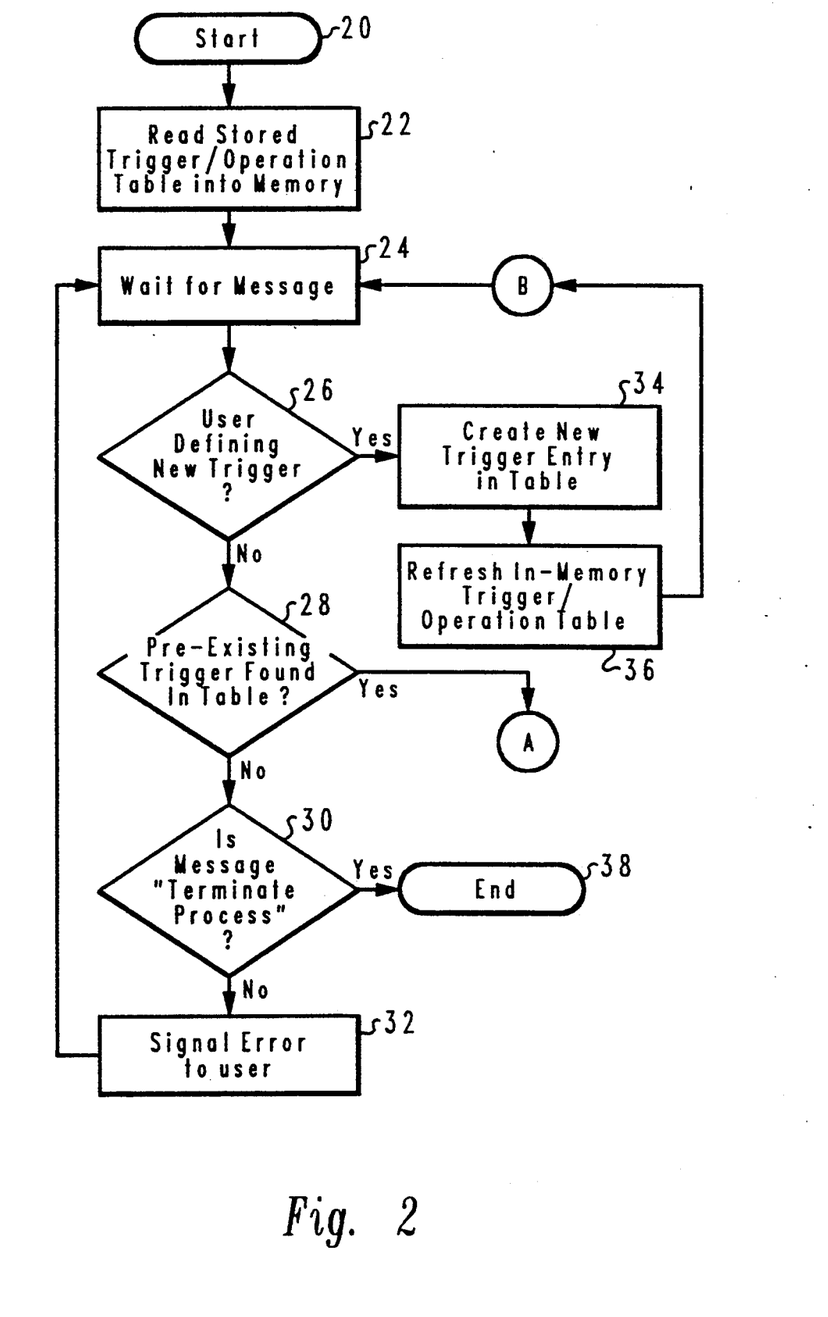
FIGS. 2 and 3 depict flowcharts for building new associations using the present invention.
Figure 3:
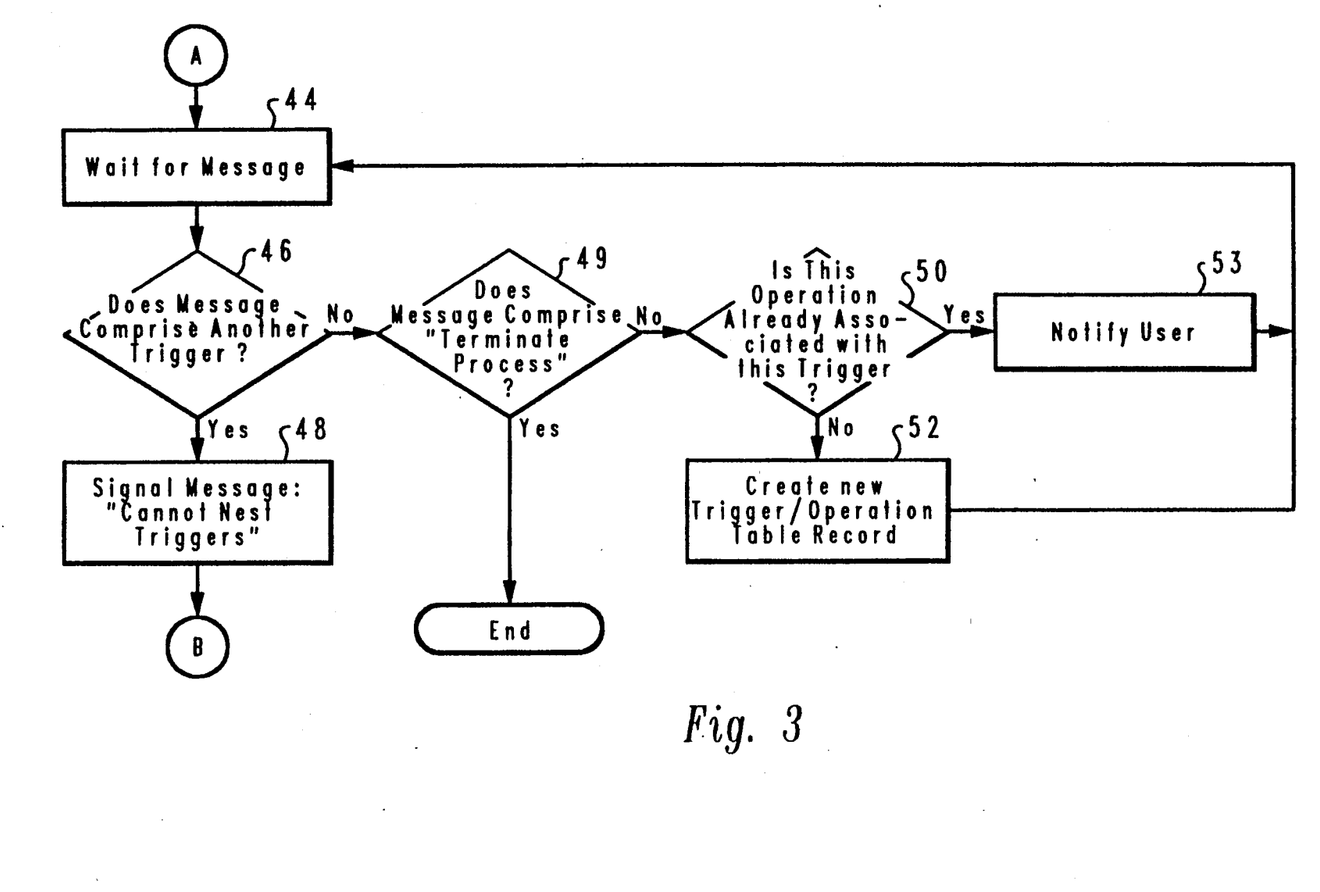

Turning now to FIG. 2, the flow diagram for building new associations among triggers and operations using the invention is shown. Processing starts at block 20 and proceeds to block 22 where the procedure reads the "Trigger/Operation" Table into memory. At block 24, the procedure waits for a message. For the purpose of this invention, a message is of the generic kind found in object-oriented programming environments. Objects communicate with one another via messages, which are nothing more than an abstraction referring to an area of memory which is updated. In this instance, the procedure is waiting for a message which refers to input from either the user, or some system event which updates a specified memory area. A message which matches some value indicates that the procedure needs to take some action. At block 26, the procedure determines whether the user is defining a new trigger. If YES, at block 34 a new trigger entry is created and inserted in the Trigger-/Operation Table. In turn, at block 36, the procedure forces a refresh of the in-memory Trigger/Operation Table and processing returns to block 24. Returning to block 26, if the user is not defining a new trigger, at block 28, a check is made to determine whether the user is specifying a pre-existing trigger which exists in the Trigger/Operation Table. If NO, processing proceeds to block 30 where a check is conducted to determine if the message is a Terminate Process Message. One skilled in the art will recognize that such a message may be generated in a variety of different ways, including an explicit action taken on the part of the user, the expiration of a given time interval (which may be stored and read from a user profile), etc. If NO, at block 32, the user is signaled that an error has occurred and control returns to block 24. Else, at block 38 the process ends. Returning to block 28, if the procedure determines that the user has specified a pre-existing trigger, processing proceeds to block 44 where the procedure pauses and waits for messages. At this point, the procedure has determined that the user has specified an existing trigger event and wishes to associate additional operations with that trigger. At block 46, a check is made to determine if the next message received is a trigger. If YES, processing proceeds to block 48 where the user is signaled that the system cannot nest triggers. In short, for the sake of simplicity, the procedure is indicating that triggers that invoke other triggers are not allowed. Returning to block 46, if the message is not a trigger, the process at block 49 checks whether the message comprises "Terminate Process". If YES, processing is ended. If NO, processing proceeds to block 50. At block 50, a check is made to determine if the operation is already associated with a trigger. If NO, processing proceeds to block 52 where a new Trigger/Operation record is written to the table. One skilled in the art will appreciate that the procedure now records actions that will be associated with that trigger. Any user actions committed before the process is terminated are candidates, unless those actions are themselves triggers for other actions. If YES, processing proceeds to block 53. At block 53, the user is notified that this operation has already been associated with the trigger. Processing then returns to block 44. It should be apparent to those skilled in the art that the invention may utilize any of a number of well-known procedures for building the association tables. These procedures may be used to assign universally unique identifiers for the actions, attributes, objects or devices of the invention. For example, the UUID capability in the Open Software Foundation's (OSF) Distributed Computing Environment (DCE) is readily adaptable to the invention. The information may be maintained in a normalized table as a field. Other fields in the table may include event type. For example, in the case of a CD-ROM drive, a record in the device table may appear as shown below:

| UUID | EVENT TYPE | LOCATION | DESCRIPTION |
| --- | --- | --- | --- |
| jj9-34 | PLAY | E: | CD-ROM-1 |
| jj9-35 | PLAY | F: | CD-ROM-2 |

The procedure is equally adaptable to the tables containing the links. For the purpose of illustration, the table may conceptually appear as follows:

| ACTION | UUID | TYPE | TRIGGERED BY |
| --- | --- | --- | --- |
| 1-817-962-3910 (Dial) | 6U3-YT | Trigger | N/A |

| ACTION | UUID | TYPE | TRIGGERED BY |
|---|---|---|---|
| DocRetrieve ("Subj = Agent") | 132-JJ | Operation | 6U3-YT |
| MSWORD.EXE (doc = "IPL.WRK") | 142-GE | Operation | 6U3-YT |
| . | . | . | . |
| . | . | . | . |
| . | . | . | . |
| 1-800-472-8866 (Dial) | G99-NQ | Trigger | N/A |
| MSWORD.EXE (doc = "BUDG.WRK") | 142-GE | Operation | G99-NQ |

Figure 4:
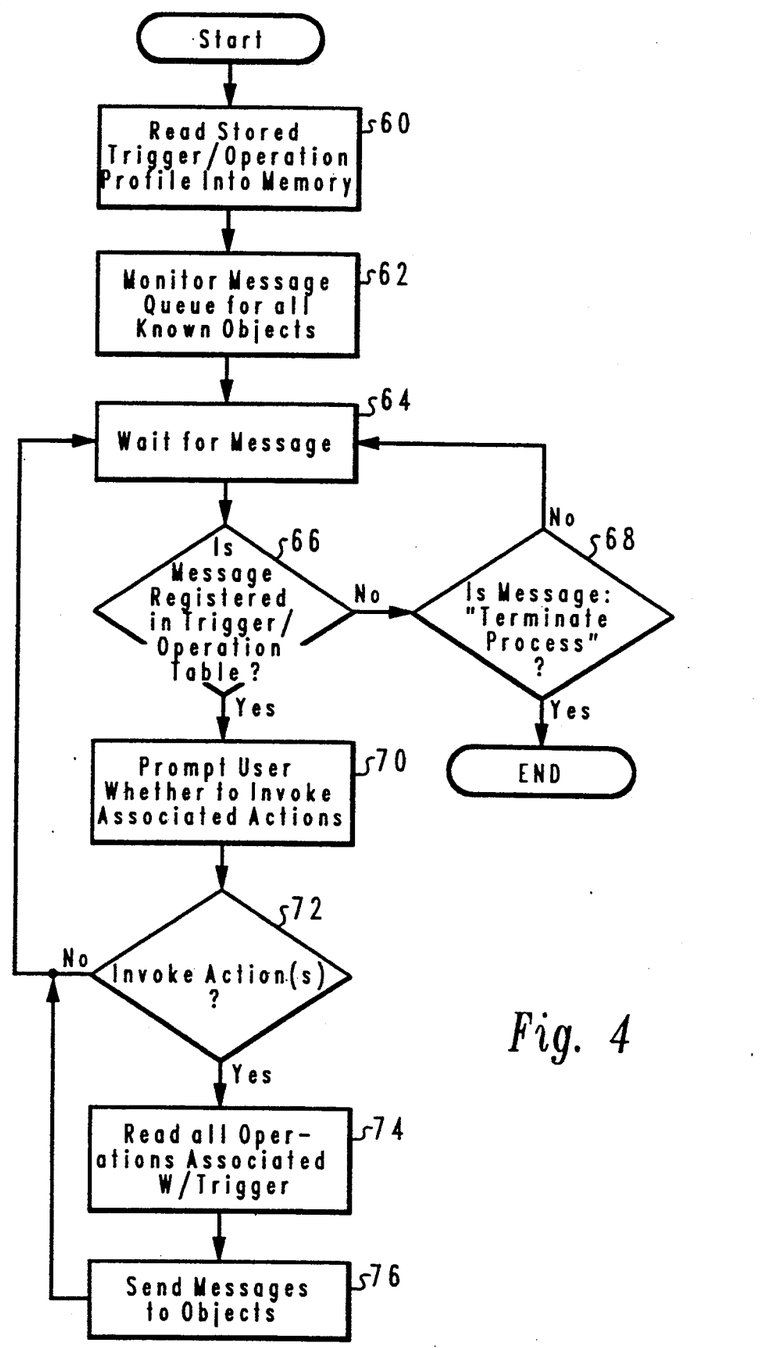
FIG. 4 depicts a flowchart for retrieving associated actions.

Turning now to FIG. 4, a description of how to execute operations associated with triggers is provided. At block 60, the procedure reads the stored Trigger/Operation Profile into memory. The procedure monitors the operating system's message queue for all known objects at block 62 and waits for a message at block 64. At block 66, the procedure checks to determine if the action is registered as a trigger in the Trigger/Operation Table. If YES, at block 70, the procedure prompts the user whether to invoke the operations. At block 72, a check is made to determine whether the user indicated that the operations should be invoked. If NO, processing returns to block 64. Else, at block 74, all of the operations associated with the trigger are read into memory. At block 76, the procedure sends messages to the objects to invoke the operations and processing returns to block 64. Returning to block 66, if it is determined that the operation is not registered in the Trigger/Operation Table, controls is transferred to block 68 where a check is initiated to determine if the message is "Terminate Process". If YES, the procedure ends. Else, control is returned to block 64 to wait for a message.

The invention will be further described by presenting an example. Assume a marketing salesperson wishes to place telephone calls to several potential customers. Related to each sales call is a number of documents containing unique descriptions of machines the salesperson wishes to discuss with each customer. Assume the marketing salesperson has several telephone calls to make. Prior to making the telephone calls, the salesperson identifies via the user interface 12 (FIG. 1) and MPI 16 (FIG. 1) the number of each customer to be called, the name of each customer, and the documents containing descriptions of the machines to be associated with each customer. Before this association takes place, the user identifies via the association builder 15 (FIG. 1) the utilities to be monitored (e.g., telephony, calendar, editor, e-mail, etc.), programs, utilities, media devices (e.g., telephone, mouse, keyboard, etc.). One skilled in the art will recognize that any well known technique may be used by the MAA 10 to identify (e.g., highlighting the desktop object) the entities to be monitored. The MAA 10 will then make the requisite operating system calls to obtain access to the identified objects. This may take the form of access to appropriate memory locations or object specific method (e.g., sending messages to that object) so the MAA 10 can query or poll each of the objects. For this example, the user specifies that the telephone and calendar are to be monitored by the MAA 10. The association builder 15, trigger action builder 17 and operational action builder 18 cause a table to be constructed in non-volatile storage containing the user's choices. The user specifies via the trigger action builder 17 that dialing a specified number for a customer is to be a trigger to retrieve the related or associated documents for the particular customer. It should be noted that the MAA 10 is capable of identifying an action as a triggering event (e.g., dialing a specific number) or an operational action (e.g., retrieving files) via interaction with the user. It should also be noted that the MPI 16 is device-independent which allows a variety of devices to interact with the MAA 10, as long as the devices conform with the MPI 16 specification. This means that any device addressable by the operating system (local or remote) on which the MAA 10 runs is a candidate for interaction with the MAA 10. Since the MAA 10 makes operating system calls to get addressability to various devices, the MAA 10 does not care about the specifics of the device. The MAA 10 is therefore insulated from device idiosyncrasies by the layer of abstraction provided by the operating system (via device drivers). After the user has inputted the attributes, devices, objects and actions that will be monitored by the MAA 10, the associations are built via the flow diagrams of FIGS. 2 and 3. The table containing the user specified items to be monitored are read into memory as shown in block 22 of FIG. 2. Processing proceeds via block 24 to block 26 where the process determines whether the user is defining a new trigger. It should be noted that the MAA 10 is capable of allowing the update of links each time the links are activated. Furthermore, the MAA 10 allows the user to build links among as many attributes of as many objects as desired, limited only by memory and processor constraints. Returning to the example, if the user wishes to create a new trigger, the procedure moves to block 34 where the new trigger entry is created in the table. At block 36, a refresh operation is forced to update the in-memory Trigger/Operation Table. If the user is satisfied that the table contains all the necessary triggers/operations, processing moves to block 28 where a check is conducted to see if a pre-existing trigger exists in the table, upon detection of a message. If the table fails to contain a trigger, an additional check is made at block 30 to see if the message is to terminate the process. If YES, the procedure ends at block 38. If NO, processing continues to block 32 where the data processing system signals an error to the user and processing returns to block 24. Returning to block 28, if a trigger is found to exist in the table, processing proceeds to FIG. 3, block 44. At block 44 the procedure waits for a message and proceeds to block 46. At block 46, the message is examined to see if it is a trigger. If YES, the data processing system signals that the system cannot nest triggers, generates an error message and returns control to block 24 (FIG. 2). Returning to block 46, if the message is not a trigger, the procedure at block 49 checks whether the message is "Terminate Process". If YES, processing is ended. If NO, processing proceeds to block 50. At block 50, the process determines whether this operation is already associated with a trigger. If YES, the process notifies the user and control is returned to block 44. If NO, at block 52 the procedure creates a new trigger/operation record and returns control to block 44. The MAA 10 will not attempt to maintain links which are redundant with those of existing services. For example, if a user wishes to link several documents with a person's name and telephone number, and a co-existing directory service maintains the associations between names and telephone numbers, the MAA 10 will store only the links between the document and the name. In this way, that person's telephone number may be updated with the directory service, while the MAA 10 links are still valid. This is accomplished by the use of co-existing service API's by the MAA 10 which are initiated upon first use. It will be apparent to those skilled in the art that an installer (e.g., System Administrator) must specify the names of other services (e.g., calendars) and the associated API's. When this is done and the logical data structures within each service are exposed to the MAA 10, updates across various services are efficiently provided via the MAA 10.

After all the associations are completed they are stored by the MAA 10. The MAA 10 may be automatically invoked by one of the stored triggers. A user can choose to have the MAA 10 act continuously (e.g., recording actions and building links passively) or "on-demand" (e.g., based on the stored triggers). Turning to FIG. 4, retrieval of the stored associated actions within the MAA 10 are shown. When the MAA 10 is invoked either by a trigger or other user specified criteria, the trigger/action table is read from storage as shown in block 60. The procedure will then monitor all message queues for all the known objects registered within the MAA 10. When one of the monitored messages are detected, the procedure will check to see if the message is registered in the Trigger/Operation Table as a trigger as shown in block 66. It should be noted that the MAA 10 exists in the data processing system as a background-/windowed/etc. process, perhaps implemented as a Terminate-and-Stay-Resident (TSR) process. If a message is found in the Trigger/Operation Table, the user will be prompted whether to invoke the associated actions per blocks-70 and 72. If the user responds affirmatively, the procedure reads all operations associated with the trigger as shown in block 74. The procedure will then send messages to objects per block 76 and return control to block 64. In this way, the salesperson may with the action of dialing a customer's number have all associated documents automatically retrieved by the MAA 10.

Figure 5:
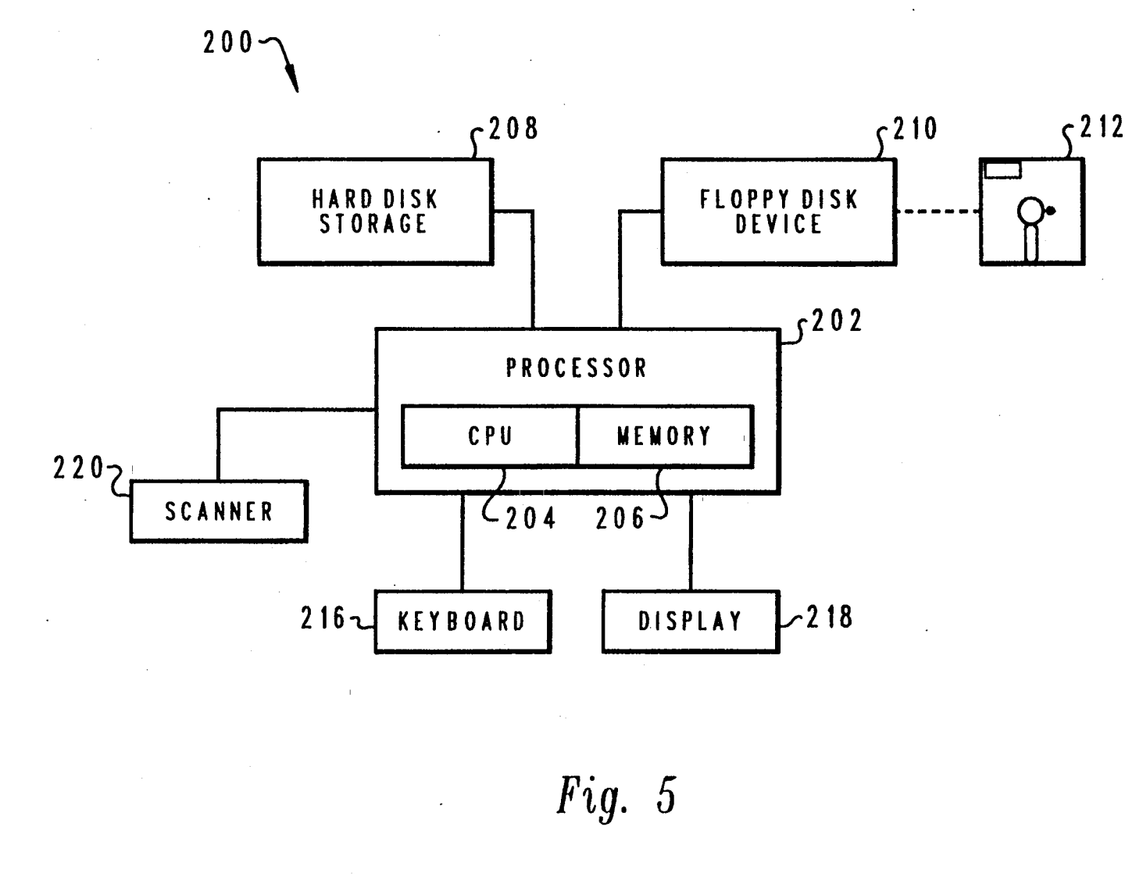
FIG. 5 shows a data processing System where operation of the present invention is carried out.

Turning now to FIG. 5, a data processing system 200 is shown where the operation of the present invention is carried out. The data processing system 200 consists of a processor 202 containing a CPU 204 and memory 206. Attached to the processor 202 is a scanner 220 for inputting information into the data processing system 200. In addition, a keyboard 216 is provided for entry of data by a user. Permanent storage is provided by hard disk storage 208 along with removable storage in the form of a floppy disk device 210. Program information or data may be inputted to the system by a floppy disk 212. A display device 218 is also provided to permit a user to view information and data processing within the data processing system.

While the invention has been particularly shown and described with reference to preferred embodiments thereof, it will be understood by those skilled in the art that various changes in form and details may be made therein without departing from the spirit and scope of the invention.

What I claim is:

1. A method, implemented in a data processing system, of creating and monitoring a plurality of desktop objects in a data processing system, comprising:

creating a table by said data processing system containing at least one of said plurality of desktop objects selected by a user of said data processing system;

associating within said table in said data processing system said one of said plurality of desktop objects a trigger and operations as specified by said user;

examining a message queue linked with said table within said data processing system and detecting a message associated with said one of said plurality of desktop objects; and automatically executing said operations associated with said one of said plurality of desktop objects in said table in response to said trigger.

2. The method of claim 1 wherein the step of automatically executing said operations includes prompting said user prior to executing said operations.

3. The method of claim 1 wherein the step of examining a message queue includes detecting if said trigger is registered in said table.

4. The method of claim 1 wherein the step of automatically executing said operations associated with said trigger includes reading a series of records stored in said table.

5. The method of claim 1 wherein the step of automatically executing said operations includes returning to said message queue for additional messages for continuous monitoring of said selected one of said plurality of desktop objects.

6. A method, implemented in a data processing system for monitoring a plurality of desktop objects in a data processing system, comprising:

loading a table having a record for at least two of said plurality of desktop objects identified to a media association agent by a user of said data processing system, said record having a trigger and user defined operations;

accessing a message queue of said data processing system linked to said media association agent for a message associated with one of said two of said plurality of desktop objects;

determining upon the detection of said message by said media association agent if said one of said two of said plurality of desktop objects is specified as trigger in said table; and executing by said media association agent said trigger in said table associated with said desktop object.

7. The method of claim 6 wherein said step of determining includes determining that said record is not in said table and creating a new record in said table for said message based on said user input.

8. The method of claim 6 wherein said step of determining includes identifying a plurality of records and terminating said media association agent within said data processing system.

9. An apparatus for creating and monitoring a plurality of desktop objects in a data processing system, comprising:

means for creating a table by said data processing system containing at least one of said plurality of desktop objects selected by a user of said data processing system;

means for associating within said table in said data processing system said one of said plurality of desktop objects operations specified by said user;

means for examining a message queue linked with said table within said data processing system and means for detecting a message associated with said one of said plurality of desktop objects; and means for automatically executing said operations associated with said one of said plurality of desktop objects in said table in response to said message in said message queue.

10. The apparatus of claim 9 wherein the means for automatically executing said operations includes means for prompting said user prior to executing said operations.

11. The apparatus of claim 9 wherein the means for examining a message queue includes means for detecting if said message is registered in said table.

12. The apparatus of claim 9 wherein the means for automatically executing said operations includes means for reading a series of records stored in said table.

13. The apparatus of claim 9 wherein the means for automatically executing said operations includes means for returning to said message queue for additional messages for continuous monitoring of said selected one of said plurality of desktop objects.

* * * * *